United States Patent
Saarem

[11] 3,827,670
[45] Aug. 6, 1974

[54] VALVE ASSEMBLY
[75] Inventor: Myrl J. Saarem, Carson City, Nev.
[73] Assignee: Richdel, Inc., Carson City, Nev.
[22] Filed: June 12, 1973
[21] Appl. No.: 369,260

Related U.S. Application Data
[63] Continuation-in-part of Ser. No. 314,177, Dec. 11, 1972, abandoned.

[52] U.S. Cl. ............................................. 251/81
[51] Int. Cl. ........................................ F16k 31/44
[58] Field of Search........ 81/52.4; 251/81, 214–225; 64/29

[56] References Cited
UNITED STATES PATENTS
| | | | |
|---|---|---|---|
| 2,067,377 | 1/1937 | Burns et al............................. | 64/29 |
| 2,608,377 | 8/1952 | Struen.................................. | 251/81 |
| 3,223,110 | 12/1965 | Mueller et al.................. | 251/335 R |

*Primary Examiner*—Henry T. Klinksiek
*Attorney, Agent, or Firm*—Jessup & Beecher

[57] ABSTRACT

A manually operated angle valve assembly is provided which has particular, although not exclusive utility in sprinkler systems, or the like. The valve assembly of the invention serves to shut off and regulate the water flow from a supply source to the sprinkler heads or other outlets of the sprinkler system. The valve assembly to be described is formed of plastic components, and it incorporates a slip clutch between the handle and the valve stem which serves to obviate high stresses in the valve as it is closed. By such a construction, the objectionable characteristic of creep in the plastic parts of the valve is eliminated. The valve assembly also incorporates an improved contamination guard, and improved thread terminations, as will be described.

5 Claims, 5 Drawing Figures

VALVE ASSEMBLY

This application is a continuation-in-part of copending Application Ser. No. 314,177, filed Dec. 11, 1972, now abandoned.

BACKGROUND OF THE INVENTION

It is desirable from an economy and corrosion-resistant standpoint for the valve in water sprinkler and other fluid distribution systems to be formed of plastic. However, the use of plastic in the construction of such valves has created problems. A major problem, for example, is the tendency for plastic materials to creep and assume distorted configurations. Also, plastic threads are susceptible to galling and seizure when contamination is present in the valve. The improved construction of the present invention successfully overcomes such problems, and it provides a plastic valve assembly which is inexpensive in its construction and operationally feasible in all respects.

The embodiments of the invention to be described is a manually operated angle valve for use, for example, in water sprinkler systems. The valve is constructed so that when the handle is turned to close the valve, it causes a threaded valve stem, spacer and sealing washer to approach and engage a seat in the valve body. A slip clutch is incorporated between the handle and the valve stem so that continued rotation of the handle after the valve has been fully closed or fully opened does not result in high stress in the threads of the stem and body of the valve.

The aforesaid high stress is obviated by the slip clutch which slips when a certain torque is exceeded. This torque is determined by a tooth configuration in the clutch and by the force of wave spring which is also included in the clutch in the embodiment to be described. Incorporation of such a slip clutch in a valve assembly overcomes the aforesaid objectionable characteristics of creep in plastic materials.

In addition, a protective contamination guard is included in the assembly to protect the threaded area of the valve from contamination which would otherwise cause galling and seizure of the plastic threads within the valve.

Moreover, there is a tendency in plastic valves for the threads to wedge when the handle is turned to its full extent in opening the valve. This tendency is corrected in the valve of the invention by molding the threads on both the stem and cap of the valve with an abrupt termination.

DETAILED DESCRIPTION OF THE ILLUSTRATED EMBODIMENT

Figure 1:
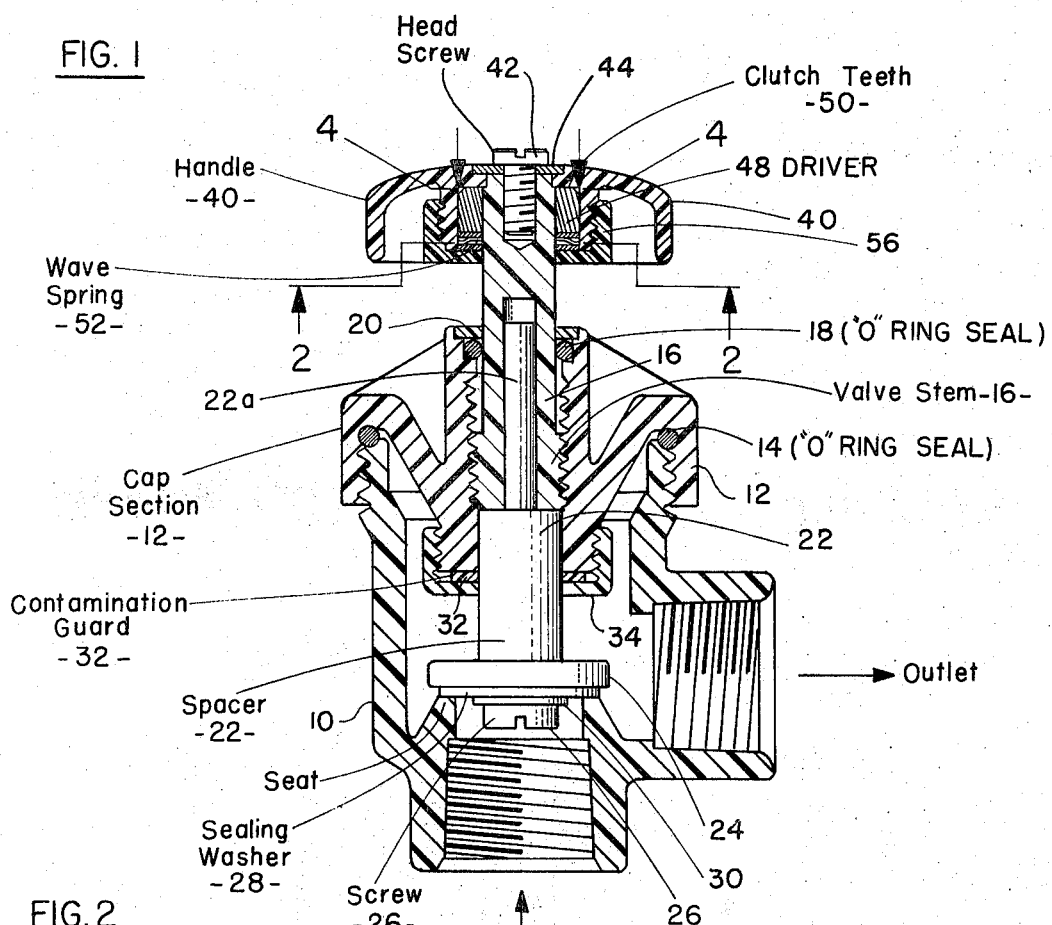
FIG. 1 is a side sectional view of a valve constructed in accordance with one embodiment of the invention.

The illustrated valve assembly includes a body section 10 and a cap section 12 formed, for example, of appropriate plastic material such as polyvinylchloride (PVC). The cap section 12 is threaded onto the body section 10, and an O-ring 14 is interposed between the two sections as a seal.

A valve stem 16 is threaded into the cap section 12, and an appropriate seal is formed between the two by an O-ring 18 which is held in place by means of a retainer ring 20. An elongated cylindrical shaped spacer 22 is supported in coaxial alignment with the valve stem 16, and the spacer has a stem section 22a which extends up into the stem 16 in a telescoping relationship. A cup washer 24 is mounted at the end of the spacer 22, and is held in place by a screw 26.

A neoprene sealing washer 28, and a metal washer 30 composed, for example, of stainless steel, are interposed between the cup washer 24 and the screw 26. The sealing washer 28 seats against a seat formed in the body 10 and surrounding the inlet opening of the valve. The valve also has an outlet opening at one side, as shown.

The valve stem 16 is threaded into the cap section 12, and a neoprene washer 32 forms a contamination guard for the threads. The contamination guard is held in place by a nut 34 which is threaded onto the cap section 12.

Figure 2:
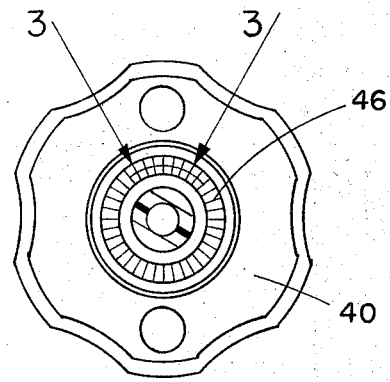
FIG. 2 is a view of the underside of the handle of the valve taken essentially along the line 2—2 of FIG. 1.

A handle 40 is relatively, rotatably secured to the upper end of the valve stem 16 by means of a screw 42. A washer 44 is interposed between the screw 42 and the handle 40. The handle 40, as best shown in FIGS. 2 and 3, has a series of camming teeth 46 formed on its underside and surrounding the center of the handle.

Figure 4:
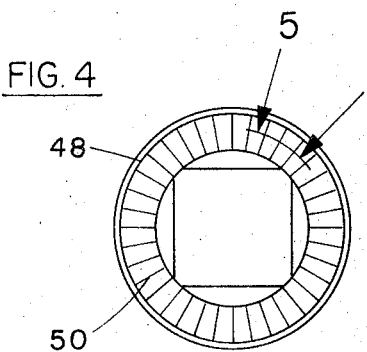
FIG. 4 is a top view of a stem driver member taken essentially along the line 4—4 of FIG. 1.
Figure 5:
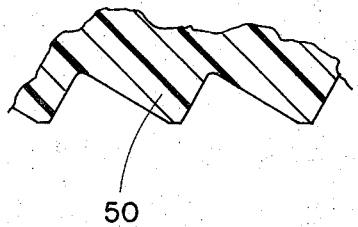
FIG. 5 is a fragmentary sectional view of the stem driver of FIG. 4 taken essentially along the line 5—5 of FIG. 4.

A stem driver 48 is mounted on the stem 16 in slidable relationship. The stem 16 has a square shape, and the driver 48 has a square central aperture which receives the stem, so that the driver 48 may slide on the stem and yet rotation of the driver will produce corresponding rotation of the stem. As best shown in FIGS. 4 and 5, the driver 48 has complementary teeth 50 formed in its upper end which engage the teeth 46 in the underside of the handle 40. The driver is biased upwardly against the handle by a wave spring washer member 52, the wave spring washer member being held in place between two flat washers by a nut 56 threaded to an inner tubular portion on the handle 40. The nut 56 is adjusted until the wave spring washer 52 exerts a predetermined biasing force on the driver 48, to bias the driver against the underside of the handle.

Figure 3:
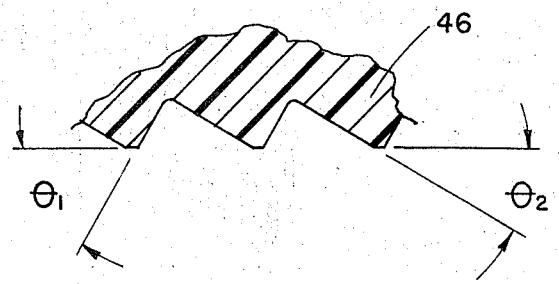
FIG. 3 is a fragmentary side view of the handle taken essentially along the lines 3—3 of FIG. 2.

The teeth 50 and 46 of the driver 48 and handle 40, as best shown in FIGS. 3 and 5, are shaped so that when the valve handle is turned to close the valve, a slippage will occur between the teeth of the handle and the teeth of the driver when a predetermined torque is exceeded. When the handle is turned to open the valve, there is a positive engagement between the teeth, and no slippage occurs until predetermined torque is exceeded greater than the previous predetermined torque. This is achieved by making the angle $\theta_1$ greater than the angle $\theta_2$ in FIG. 3. The reverse (opening) slippage torque may, for example, be 30 percent greater than the forward (closing) slippage torque.

The stem 16 of the valve may also be composed of appropriate plastic material. The slip clutch assembly described above prevents excessive internal stresses in the valve when it is closed or opened, so there is no tendency for the various plastic parts of the valve to creep and stick. The contamination guard 32 prevents any contaminating liquid handled by the valve from reaching the threads between the stem 16 and the cap section 12, so that galling and seizure of the threads is prevented.

The threads on the cap 12 and stem 16 are molded to have an abrupt termination, so that there is no tendency for the valve stem to stick when the valve is opened to its full extent. Moreover, the teeth 46 and 50 of the handle 40 and driver 48 are molded to have an angular termination, as described, so that the slippage torque on opening the valve may be greater than the slippage torque on closing the valve. In this way a positive force is transmitted between the handle and the valve stem when the valve is closed or opened, and yet there is no tendency for damage to the valve threads when the valve is closed or opened to its full extent.

In a typical construction, for example, slippage may be made to occur during closing at a torque 100 percent greater than that required for adequate sealing, and during opening at a torque 100 percent greater than that required to lift the poppet off the seat. In each case the slippage torque is significantly less than the torque required to cause damage to the threads of the stem 16 or cap 12.

The invention provides, therefore, an improved and simplified plastic valve which, in the illustrated embodiment is constructed so that its components may be formed of plastic material, and yet there is no tendency for the plastic parts of the valve to be adversely affected by operation of the valve.

It will be appreciated that while a particular embodiment of the invention has been shown and described, modifications may be made. It is intended in the claims to cover the modifications which come within the spirit and scope of the invention.

I claim:

1. A valve assembly comprising: a body section; a valve stem rotatable in said body section to open and close the valve; a handle relatively, rotatably mounted at one end of said valve stem having camming teeth formed on the under side thereof surrounding the valve stem and havng an inner tubular portion surrounding the teeth; and a slip clutch coupling said handle to said valve stem, said slip clutch including a driver member for the valve stem axially slidably non rotatably mounted on the valve stem and having complementary teeth formed in the upper end thereof, a wave-shaped resilient washer mounted on said handle resiliently to bias said driver member into the inner tubular portion of said handle to cause the teeth of said driver member to engage the teeth of the handle, and a nut threaded to the inner tubular portion of the handle to hold the resilient washer in its biasing relationship with the driver member; so that rotation of the handle causes the driver member to impart rotational movement to the valve stem, and said clutch permitting relative movement between said handle and said valve stem when a particular torque is exceeded.

2. The valve assembly defined in claim 1, in which the teeth of the handle and of the driver member are shaped to prevent slippage of the clutch for the valve-closing direction of rotation of said handle until a first torque has been exceeded, and to prevent slippage of said clutch for the valve-opening direction of rotation thereof until a second torque greater than said first torque has been exceeded.

3. The valve assembly defined in claim 1, and which includes a cap section threaded to said body section, and in which said stem and said cap section have mating threads so that said stem may be threaded into said cap section.

4. The valve assembly defined in claim 3, and which includes a resilient washer mounted on the underside of said cap section and surrounding said valve stem to serve as a contamination guard for the threads of said stem and cap section.

5. The valve assembly defined in claim 3, in which said threads of said stem and cap section are formed with an abrupt termination to obviate any tendency for the valve stem to stick, when the valve is opened to its full extent.

* * * * *